United States Patent
Maezawa et al.

(10) Patent No.: US 7,053,385 B2
(45) Date of Patent: *May 30, 2006

(54) RADIOGRAPHIC IMAGE CONVERSION PANEL AND METHOD FOR MANUFACTURING THE SAME

(75) Inventors: Akihiro Maezawa, Hino (JP); Noriyuki Mishina, Hino (JP)

(73) Assignee: Konica Minolta Holdings, Inc. (JP)

( * ) Notice: Subject to any disclaimer, the term of this patent is extended or adjusted under 35 U.S.C. 154(b) by 57 days.

This patent is subject to a terminal disclaimer.

(21) Appl. No.: 10/684,184

(22) Filed: Oct. 9, 2003

(65) Prior Publication Data

US 2004/0069955 A1    Apr. 15, 2004

(30) Foreign Application Priority Data

Oct. 15, 2002  (JP) .............................. 2002-300306
Feb. 14, 2003  (JP) .............................. 2003-036451

(51) Int. Cl.
*H05B 33/00* (2006.01)
*A61B 6/00* (2006.01)
*G01N 23/04* (2006.01)

(52) U.S. Cl. .................... 250/484.4; 250/582
(58) Field of Classification Search ............ 250/484.4, 250/581, 548, 483.1, 582; 427/65, 69, 139; 976/DIG. 439

See application file for complete search history.

(56) References Cited

U.S. PATENT DOCUMENTS

| 4,741,993 A | 5/1988 | Kano et al. |
| 4,835,398 A * | 5/1989 | Nakamura ................ 250/484.4 |
| 6,870,167 B1 * | 3/2005 | Iwabuchi et al. ......... 250/484.4 |
| 2001/0042853 A1 | 11/2001 | Hampden-Smith et al. |
| 2005/0051737 A1 * | 3/2005 | Maezawa et al. ......... 250/484.4 |

FOREIGN PATENT DOCUMENTS

| EP | 0 144 772 | 6/1985 |
| GB | 1 477 639 | 6/1977 |

OTHER PUBLICATIONS

European Search Report for Application No. 03022714.4-2213-dated Jan. 30, 2004.

* cited by examiner

*Primary Examiner*—David Porta
*Assistant Examiner*—Frederick F. Rosenberger
(74) *Attorney, Agent, or Firm*—Cantor Colburn LLP

(57) ABSTRACT

A radiographic image conversion panel including a support; and at least one photostimulable phosphor layer provided on the support. The layer has a film thickness of 50 µm to 1 mm, and has not less than two luminescence wavelength peaks between 350 nm and 450 nm.

10 Claims, 1 Drawing Sheet

RADIOGRAPHIC IMAGE CONVERSION PANEL AND METHOD FOR MANUFACTURING THE SAME

BACKGROUND OF THE INVENTION

1. Field of the Invention

The present invention relates to a radiographic image conversion panel and a method for producing the radiographic image conversion panel.

2. Description of Related Art

In earlier technology, so-called radiography in which a silver salt is used in order to obtain a radiographic image has been utilized. However, a method for imaging a radiological image without using a silver salt has been developed. That is, a method for imaging by absorbing a radiation ray transmitted through a subject in a phosphor, thereafter, exciting the phosphor with a certain type of energy, and radiating the radiographic energy accumulated in the phosphor as a fluorescence is disclosed.

Concretely, a radiographic image conversion method in which a panel provided with a photostimulable phosphor layer on a support and either or both of visible ray and infrared ray is used as excitation energy has been known (for example, see U.S. Pat. No. 3,859,527 specification).

As radiographic image conversion methods using photostimulable phosphors having higher luminance and higher sensitivity, a radiographic image conversion method using a BaFX:$Eu^{2+}$ system (X: Cl, Br, I) phosphor (for example, see Japanese Patent Laid-Open Publication No. Sho 59-75200), a radiographic image conversion method using an alkali halide phosphor (for example, see Japanese Patent Laid-Open Publication No. Sho 61-72087), and an alkali halide phosphor containing metals of $Tl^+$, $Ce^{3+}$, $Sm^{3+}$, $Eu^{3+}$, $Y^{3+}$, $Ag^+$, $Mg^{2+}$, $Pb^{2+}$, $In^{3+}$ as co-activators (for example, see Japanese Patent Laid-Open Publications Nos. Sho 61-73786 and Sho 61-73787) are developed.

Furthermore, recently, in analysis of diagnostic imaging, a radiographic image conversion panel having higher sharpness has been required. As a method for improving the sharpness, for example, attempts for improving sensitivity and sharpness by controlling the shape of photostimulable phosphors have been made.

As one of these attempts, for example, there is a method for using a photostimulable phosphor layer having a fine quasi-columnar block formed by depositing a photostimulable phosphor on a support having a fine concavoconvex pattern (for example, see Japanese Patent Laid-Open Publication No. Sho 61-142497).

Further, a method for using a radiographic image conversion panel having a photostimulable phosphor layer in which cracks between columnar blocks obtained by depositing a photostimulable phosphor on a support having a fine pattern are shock-treated to be further developed (for example, see Japanese Patent Laid-Open Publication No. Sho 61-142500), further, a method for using a quasi-columnar radiographic image conversion panel in which cracks are caused from the surface side of a photostimulable phosphor layer formed on a face of a support (for example, see Japanese Patent Laid-Open Publication No. Sho 62-39737), furthermore, a method for providing cracks by forming a photostimulable phosphor layer having a void on an upper face of a support according to deposition, and thereafter, by growing the void according to heat treatment (for example, see Japanese Patent Laid-Open Publication No. Sho 62-110200), and the like are suggested.

Furthermore, a radiographic image conversion panel having a photostimulable phosphor layer in which an elongated columnar crystal having a constant slope to a normal line direction of a support is formed on the support according to a vapor phase deposition method (for example, see Japanese Patent Laid-Open Publication No. Hei 2-58000) is suggested.

Recently, a radiographic image conversion panel using a photostimulable phosphor in which Eu is activated to a ground material of alkali halide such as CsBr or the like is suggested. Particularly, it becomes possible to derive a high X-ray conversion efficiency, which was unable to be obtained in earlier technology, by using Eu as an activator.

However, with a host crystal of alkali halide, when its composition is made to increase X-ray absorption, the strain of the crystal becomes large. Even though it has high luminance, the luminescence distribution in luminescence wavelength expands and the luminescence becomes broad since it has many luminescence levels. The effect of this broad luminescence becomes remarkable when Eu is used as an activator. Although the luminance is high, the persistence and response deteriorate since the distribution at the luminescence levels is expanded.

When alkali halide is used in CR detector as a radiographic imaging system, the problem of this persistence is large. As the radiographic imaging system, the problem is that a constant time is required to be taken before the reading after X-ray exposure as effect of instant persistence. As the effect of photostimulated persistence, the problem is that the contrast of reading deteriorates according to the persistence. Further, the persistence also affects reading rate (reading cycle and utilization frequency).

Therefore, improvement relating to properties, which measure up to improvement of luminance and sharpness required from market as a radiographic image conversion panel and to speeding up, has been required.

On the other hand, diffusion of Eu according to heat is remarkable, and there is a problem such that the existence of Eu in a ground material is distributed unevenly according to dispersion and the like since the vapor pressure under vacuum is also high. Thereby, it has not yet been in practical use at market since it is difficult to obtain an aimed high X-ray conversion efficiency.

Particularly, in activation of rare-earth element capable of obtaining a high X-ray conversion efficiency, with respect to film formation under vacuum, uniformizing is more difficult problem than vapor pressure property. Further, in manufacturing method, there is a problem such that the existence state of the activator becomes nonuniform since a number of heat treatments, such as heating of raw materials when preparing the photostimulable phosphor layers, heating of substrates (supports) at the time of vacuum deposition, and annealing (strain relaxation of substrates) treatment after film formation, is performed to these photostimulable phosphor layers formed by vapor phase growth (deposition).

Therefore, improvement in uniformity relating to manufacturing, which measures up to improvement of luminance and sharpness required from market as a radiographic image conversion panel, has been required.

Particularly, the effect of nonuniformity of evaporation raw materials in thermal expansion of base materials at the time of heating and cooling is large in phosphor layer face property. Effects such that its adhesiveness deteriorates when the film thickness becomes thick, that cracks are easily generated, and the like can be recognized remarkably in macroscopic and also in fine structure. These effects are a problem.

SUMMARY OF THE INVENTION

An object of the present invention is to provide a radiographic image conversion panel having low persistence (instant persistence and photostimulated persistence) and showing high luminance and high sensitivity, and to provide a method for manufacturing the radiographic image conversion panel.

Further, another object of the present invention is to provide a radiographic image conversion panel having high contrast and showing high luminance and low persistence, and to provide a method for manufacturing the radiographic image conversion panel.

In order to achieve the above-described objects, according to a first aspect of the present invention, the radiographic image conversion panel of the present invention comprises: a support; and at least one photostimulable phosphor layer provided on the support, wherein the layer has a film thickness of 50 μm to 1 mm, and has not less than two luminescence wavelength peaks between 350 nm and 450 nm.

Further, according to a second aspect of the present invention, the radiographic image conversion panel of the present invention comprises: a support; and at least one photostimulable phosphor layer provided on the support, wherein the layer has a film thickness of not less than 50 μm, and a crystallite size of a photostimulable phosphor in the layer is not less than 90 nm.

In the radiographic image conversion panel, the film thickness of the layer is preferable to be between not less than 50 μm and not more than 20 mm.

In the above-described first and second aspects, the layer is preferably formed according to a vapor phase growth.

According to a third aspect of the present invention, the method for manufacturing a radiographic image conversion panel having at least one photostimulable phosphor layer of the present invention, comprises: forming the layer according to a vapor phase growth so that the layer has a film thickness of 50 μm to 1 mm and not less than two luminescence wavelength peaks between 350 nm and 450 nm.

According to a fourth aspect of the present invention, the method for manufacturing a radiographic image conversion panel having at least one photostimulable phosphor layer of the present invention, comprises: forming the layer according to a vapor phase growth so that a film thickness of the layer becomes not less than 50 μm, and that a crystallite size of a photostimulable phosphor in the layer becomes not less than 90 nm.

According to the above-described first to fourth aspects, preferably, the layer contains a photostimulable phosphor having an alkali halide represented by the following Formula (1) as a ground material, $$M^1X.aM^2X'_2:eA, A'' \tag{1}$$

wherein the $M^1$ is at least one kind of alkali metal selected from a group consisting of Li, Na, K, Rb and Cs, the $M^2$ is at least one kind of bivalent metal atom selected from a group consisting of Be, Mg, Ca, Sr, Ba, Zn, Cd, Cu and Ni, each of the X and the X' is at least one kind of halogen selected from a group consisting of F, Cl, Br and I, each of the A and the A'' is at least one kind of rare-earth element selected from a group consisting of Eu, Tb, In, Ce, Tm, Dy, Pr, Ho, Nd, Yb, Er, Gd, Lu, Sm and Y, and each of the a and the e represents a numeric value in a range of $0 \leq a < 0.5$ and $0 < e \leq 0.2$.

Further, the layer may contain a photostimulable phosphor having an alkali halide represented by the following Formula (2) as a ground material, $$M^{11}X_1.bM^{12}X'_1{}_2.cM^{13}X''_1{}_3:fA_1 \tag{2}$$

wherein each of the $M^{11}$ and the $M^{12}$ is at least one kind of alkali metal selected from a group consisting of Li, Na, K, Rb and Cs, the $M^{11}$ and the $M^{12}$ being different alkali metal from each other, the $M^{13}$ is at least one kind of tervalent metal atom selected from a group consisting of Y, La, Ce, Pr, Nd, Pm, Sm, Eu, Gd, Tb, Dy, Ho, Er, Tm, Yb and Lu, each of the $X_1$, the $X_1{}'$ and the $X_1{}''$ is at least one kind of halogen selected from a group consisting of F, Cl, Br and I, the $A_1$ is at least one kind of rare-earth element selected from a group consisting of Eu, Tb, In, Cs, Ce, Tm, Dy, Pr, Ho, Nd, Yb, Er, Gd, Lu, Sm and Y, and each of the b, the c and the f represents a numeric value in a range of $0 \leq b < 0.5$, $0 \leq c < 0.5$ and $0 < f \leq 0.2$.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE INVENTION

Figure 1:
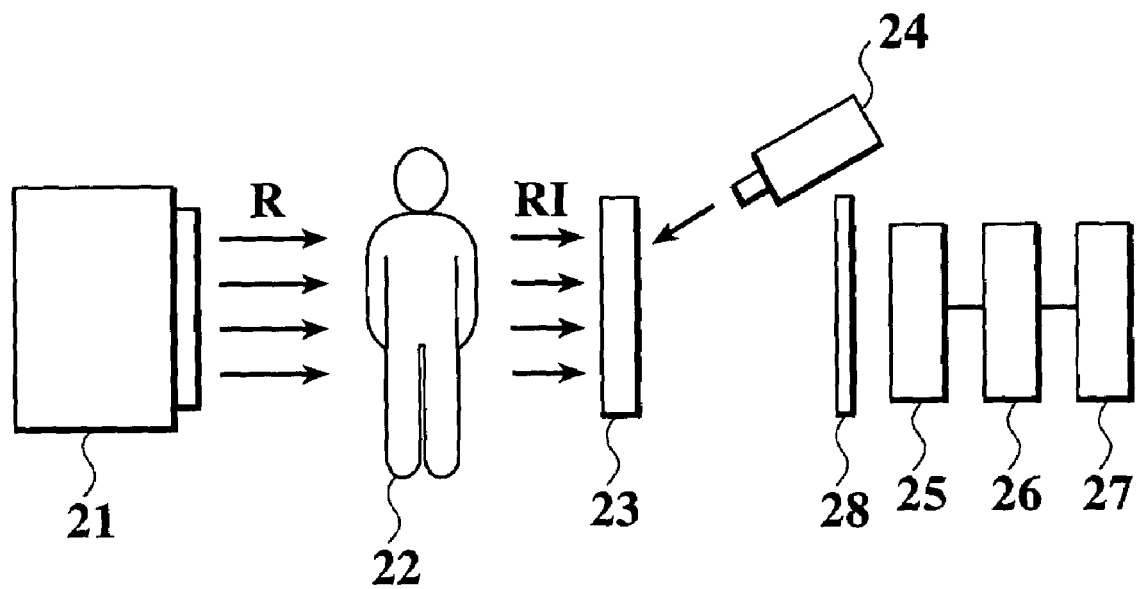
FIG. 1 is a schematic view showing an example of a usage system of a radiographic image conversion panel of the present invention.

Hereinafter, the present invention will be explained in detail.

Generally, a photostimulable phosphor shows photostimulated luminescence of a wavelength range between 300 nm and 500 nm according to an excitation light of 400 nm to 900 nm. However, the present inventors have found that the persistence improves remarkably when a photostimulable phosphor has two or more luminescence wavelength peaks in between 350 nm and 450 nm.

The photostimulable phosphor shown with the Formula (1) has a phosphor main activator (hereafter, also referred to as "main activator"), a phosphor sub-activator 1 (hereafter, also referred to as "sub-activator 1") and a phosphor sub-activator 2 (hereafter, also referred to as "sub-activator 2") as activators in response to a phosphor ground material (for example, CsBr).

When Gd, which is a phosphor sub-activator 1, is added as a diffusion inhibitor of the phosphor main activator Eu, the stabilization of luminescence distribution becomes possible by suppressing the thermal diffusion rate of Eu according to the existence of Gd, and by preventing uneven distribution of Eu in crystals after formation of deposited film and preventing dispersion of Eu from the film.

Ce, which is a phosphor sub-activator 2, is added as a level stabilizer of Eu. According to the existence of Ce, crystal stability according to lattice defect by introduction of Eu increases, and the luminescence distribution does not expand even though there exists uneven distribution of Eu. Therefore, the luminescence becomes sharp.

In formation of deposited film according to vapor phase deposition, the melting point lowers according to impurities (including activators) added in the phosphor ground material crystal CsBr. Particularly, when Eu is added, the melting point of raw materials lowers, so that the control at the time of evaporation becomes difficult. As for lowering of melting point at CsBr, it gradually volatilizes from CsBr having low melting point, so that Eu required to be introduced into a film as an activator under normal circumstances cannot be introduced. Therefore, in CsBr deposition, in case of introducing Eu, for example, when a mixture of CsBr and $EuBr_2$ is introduced, the raw materials can be heated at a temperature not less than 20° C. higher than the melting point of $EuBr_2$ at the time of heating the raw materials, and vapor can be formed.

In case of depositing by using double salt crystals of $(Cs_a, Eu_b)Br_x$ (a+b=x), the raw materials are heated at a temperature not less than 20° C. higher than the melting point of $EuBr_2$, and vapor is formed as in the above. Therefore, the film thickness formation rate at the time of evaporation is preferable to be not less than 20 μm/min, and most preferably, not less than 60 μm/min.

However, since the vapor generation amount is unable to be controlled sufficiently only by heat control at the vapor melting point, the crystals obtained on the substrate are not columnar, fair needle crystals, and are crystals having many puckers. Therefore, the obtained sharpness deteriorates extremely. Accordingly, it becomes important to add Ce and Gd, to suppress the melting point in a constant range, and moreover, to control the volatilization generation amount by forming a baffle plate between the volatilizing raw materials and the substrate so that the substrate deposition amount becomes constant. The baffle plate provided between the substrate and the raw material deposition source is desirable to be formed so as to be parallel to the raw materials and the substrate, and to be formed in a shape that the passage suppression in center is large and the passage suppression at sides becomes small in accordance with the volatilization temperature (for example, the number of holes is small in the center and large at sides).

As for the photostimulable phosphor represented by Formula (1) of the present invention, the character $M^1$ represents at least one kind of alkali metal selected from a group selected from Li, Na, K, Rb and Cs. However, it is preferable to be an alkali metal selected from a group consisting of Rb and Cs, and further, Cs is preferably used. The character $M^2$ represents at least one kind of bivalent metal atom selected from a group consisting of Be, Mg, Ca, Sr, Ba, Zn, Cd, Cu and Ni. However, among these, a bivalent metal atom selected from Be, Mg, Ca, Sr and Ba is preferably used.

From viewpoint of improving the photostimulated luminescence luminance of the photostimulable phosphor, the characters X and X' are at least one kind of halogen selected from a group consisting of F, Cl, Br and I. However, it is preferable to be at least one kind of halogen selected from a group consisting of F, Cl and Br, and more preferably, it is a halogen selected from a group consisting of Br and I.

The photostimulable phosphor represented by Formula (1) of the present invention is manufactured, for example, by a manufacturing method described in the following.

At first, as phosphor raw materials, (a) at least one or two or more kind among NaF, NaCl, NaBr, NaI, KF, KCl, KBr, KI, RbF, RbCl, RbBr, RbI, CsF, CsCl, CsBr and CsI; (b) at least one or two ore more kind among $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2.2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI$, $NiF_2$, $NiCl_2$, $NiBr_2$ and $NiI_2$; and (c) in Formula (1), a compound having a metal selected from a group consisting of Eu, Tb, In, Ce, Tm, Dy, Pr, Ho, Nd, Yb, Er, Gd, Lu, Sm, Y, Tl, Na, Ag, Cu and Mg.

In the photostimulable phosphor shown stoichiometrically by Formula (1), the character a is in a range of $0 \leq a < 0.5$, preferably, $0 \leq a < 0.01$, and the character e is in a range of $0 < e \leq 0.2$, preferably, $0 < e \leq 0.1$.

The phosphor raw materials in the above-described (a) to (c) are weighed so as to be in a mixed composition of the above-described numeric range, and are mixed sufficiently by using a mortar, ball mill, mixer mill or the like.

Next, the obtained raw material mixture is filled in a heat-proof container such as quartz crucible, alumina crucible or the like, and calcining is performed in an electric furnace. The suitable calcining temperature is between 500° C. and 1000° C. The calcining time differs according to the filling amount, calcining temperature and the like of the raw material mixture, however, generally, between 0.5 and 6 hours is suitable. As calcining atmosphere, mild reducing atmosphere such as nitrogen gas atmosphere including small amount of hydrogen gas, carbon acid gas atmosphere including small amount of carbon monoxide, and the like; neutral atmosphere such as nitrogen gas atmosphere, argon gas atmosphere and the like; or mild oxidizing atmosphere including small amount of oxygen gas is preferable. In addition, once after calcining is performed with the above-described calcining conditions, the calcined material is taken out from the electric furnace to be crushed. Thereafter, the powders of the calcined material are again filled in the heat-proof container, are put into the electric furnace, and re-calcining is performed with the same calcining conditions as above. Accordingly, the luminescence luminance can be made higher. Further, in case of cooling the calcined material from the calcining temperature to room temperature, a desired phosphor can also be obtained by taking the calcined material out of the electric furnace and cooling it in air. However, it may be cooled under remaining mild reducing atmosphere or neutral atmosphere, which is the same as at the time of calcining. Further, the luminescence luminance of the obtained phosphor according to stimulation can be made further higher by making the calcined material move from a heating section to a cooling section in the electric furnace, and by cooling it rapidly under mild reducing atmosphere, neutral atmosphere or mild oxidizing atmosphere.

Further, the present inventors have considered various problems described above. As a result, the inventors have found that in a radiographic image conversion panel having at least one photostimulable phosphor layer on a support, by adjusting the layer so as to have a film thickness of not less than 50 μm, and the crystallite size of the photostimulable phosphor to be not less than 90 nm, a radiographic image conversion panel having high contrast and showing high luminance and low persistence can be obtained.

[Photostimulable Phosphor]

The photostimulable phosphor according to the present invention will be explained.

As the photostimulable phosphor according to the radiographic image conversion panel of the present invention, a photostimulable phosphor in earlier technology, which is well known to a person skilled in the art, can be used. However, the photostimulable phosphor represented by Formula (2) is preferable.

As the photostimulable phosphor represented by Formula (2), each of the characters $M^{11}$ and $M^{12}$ is at least one kind of alkali metal selected from a group consisting of Li, Na, K, Rb and Cs. However, an alkali metal represented by Rb or Cs is preferable, and furthermore, Cs is preferably used.

The character $M^{13}$ represents at least one kind of tervalent metal selected from a group consisting of Y, La, Ce, Pr, Nd, Pm, Sm, Eu, Gd, Tb, Dy, Ho, Er, Tm, Yb, and Lu. Among these, at least one kind of tervalent metal selected from a group consisting of Y, Ce, Sm, Eu, La, Gd, and Lu is preferably used.

As the $A_1$ in Formula (1), at least one kind of metal selected from a group consisting of Eu, Ce, Sm, Tl and Na is preferable, and Eu is particularly preferable.

From viewpoint of improving the photostimulated luminescence luminance of the photostimulable phosphor, as for the $X_1$, $X'_1$ and $X''_1$, at least one kind of halogen selected from a group consisting of F, Cl, Br and I is used. However, at least one kind of halogen selected from a group consisting of F, Cl and Br is preferable, a halogen selected from a group consisting of Br and I is further preferable, and Br is particularly preferable.

Further, in Formula (2), the value of b is $0 \leq b<0.5$, preferably, $0 \leq b<0.01$.

[Method for Manufacturing Photostimulable Phosphor]

The photostimulable phosphor represented by Formula (2) of the present invention is manufactured, for example, by a manufacturing method described in the following.

At first, as phosphor raw materials, acid (HI, HBr, HCl or HF) is added to carbonate so as to obtain the following composition, and they are mixed and agitated. Thereafter, filtration is performed at a point of neutralization, and the moisture of the obtained filtrate is evaporated and vaporized, and the following crystal is prepared.

(d) at least one or two or more kind among NaF, NaCl, NaBr, NaI, KF, KCl, KBr, KI, RbF, RbCl, RbBr, RbI, CsF, CsCl, CsBr and CsI;

(e) at least one or two ore more kind among $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI$, $NiF_2$, $NiCl_2$, $NiBr_2$ and $NiI_2$; and (f) in Formula (2), an activator raw material having a metal selected from a group consisting of Eu, Tb, In, Cs, Ce, Tm, Dy, Pr, Ho, Nd, Yb, Er, Gd, Lu, Sm, Y, Tl, Na, Ag, Cu and Mg are used.

In the photostimulable phosphor shown stoichiometrically by Formula (2), the character b is preferable to be in a range of $0 \leq b<0.5$, preferably, $0 \leq b<0.01$;

the character c is preferable to be in a range of $0 \leq c<0.5$, preferably, $0 \leq c<0.01$;

the character f is preferable to be in a range of $0<f \leq 0.2$, preferably, $0<f \leq 0.1$.

The phosphor raw materials in the above-described (d) to (f) are weighed so as to be in a mixed composition of the above-described numeric range, and are dissolved with pure water. In this case, they may be mixed sufficiently by using a mortar, ball mill, mixer mill or the like. Then, after a predetermined acid is added so as to adjust the pH value of the obtained solution, the moisture is evaporated and vaporized.

Next, the obtained raw material mixture is filled in a heat-proof container such as quartz crucible, alumina crucible or the like, and calcining is performed in an electric furnace. The suitable calcining temperature is between 500° C. and 1000° C. The calcining time differs according to the filling amount, calcining temperature and the like of the raw material mixture, however, generally, between 0.5 and 6 hours is suitable. As calcining atmosphere, mild reducing atmosphere such as nitrogen gas atmosphere including small amount of hydrogen gas, carbon acid gas atmosphere including small amount of carbon monoxide, and the like; neutral atmosphere such as nitrogen gas atmosphere, argon gas atmosphere and the like; or mild oxidizing atmosphere including small amount of oxygen gas is preferable. In addition, once after calcining is performed with the above-described calcining conditions, the calcined material is taken out from the electric furnace to be crushed. Thereafter, the powders of the calcined material are again filled in the heat-proof container, are put into the electric furnace, and re-calcining is performed with the same calcining conditions as above. Accordingly, the luminescence luminance can be made higher. Further, in case of cooling the calcined material from the calcining temperature to room temperature, a desired phosphor can also be obtained by taking the calcined material out of the electric furnace and cooling it in air. However, it may be cooled under remaining mild reducing atmosphere or neutral atmosphere in the same as at the time of calcining. Further, the luminescence luminance of the obtained phosphor according to stimulation can be made further higher by making the calcined material move from a heating section to a cooling section in the electric furnace, and by cooling it rapidly under mild reducing atmosphere, neutral atmosphere or mild oxidizing atmosphere.

(Method for Introducing Activators)

As methods for introducing activator raw materials into a photostimulable phosphor, there are a dry-type introduction method and wet-type introduction method.

The dry-type introduction method includes a method for introducing activators by mixing powders, heating and calcining them to thermally diffuse them in a base material (also referred to as "phosphor raw material"), and a method for introducing activators by using activators to be introduced as vapor and heating the base metal.

The one for carrying out the mixing of powders is preferable to be convenient, easy to be used practically in large areas and to have high heat temperature. When utilizing it, it is preferable to control the temperature distribution.

Further, the latter method using activators by vaporizing them is capable of introducing by heating the base material at comparatively low temperature. However, in order to introduce the activators uniformly to make the activators into vapor, it is preferable to contain the activator vapor into a container while performing constant heating, or to perform response to equipment for introducing gas in a heat unit having a passage to introduce the activator vapor. Thereby, a troublesome response is required.

Then, in case of aiming at making large area and stable introduction, with respect to solvent (for example, water) soluble materials, the following wet-type introduction method for uniformizing in wet-type and introducing constantly is preferably used.

The wet-type introduction method is for adding materials to be base material into mother liquid and making them into a solution, and adding activators to be additives into the solution. After addition of the activators, the solution may be dried and solidified, or the base material in which the activators are introduced can be obtained by performing coprecipitation by using suitable additives and the like, and drying the obtained precipitate.

As for introduction of activators into the photostimulable phosphor according to the present invention, either of the above-described dry-type introduction method and wet-type introduction method may be used.

[Formation of Photostimulable Phosphor Layer]

Formation of the photostimulable phosphor layer according to the present invention will be explained.

With the radiographic image conversion panel of the present invention, it is an essential requirement to form at least one photostimulable phosphor layer by the vapor phase method (also referred to as vapor phase deposition method or vapor phase growth). As the vapor phase method, a deposition method, sputtering method, CVD method, ion plating method and the like can be used.

In the deposition method as a first method, at first, a support is placed in a deposition apparatus 1, and air in the deposition apparatus 1 is discharged so as to obtain a degree of vacuum of approximately $1.333 \times 10^{-4}$ Pa. Next, at least one of the above-described photostimulable phosphors is heated and evaporated by a method such as resistive heating, electron beam method or the like, and the photostimulable phosphor on the support is grown to a desired thickness on the surface of the support.

As a result, a photostimulable phosphor layer without containing a binder is formed. However, in the above-described deposition step, it is possible to form a photostimulable phosphor layer in plural numbers. Further, in the above-described deposition step, it is possible to codeposit by using a plurality of resistance heaters or electron beams and to form a photostimulable phosphor layer simultaneously by synthesizing the aimed photostimulable phosphor.

After the deposition is terminated, the radiographic image conversion panel of the present invention is manufactured by providing a protective layer to the opposite side of the side of the support where the photostimulable phosphor layer is formed, according to need. In addition, a procedure of providing the support after forming the photostimulable phosphor layer on the protective layer may be carried out.

Moreover, in the above-described deposition method, the material to be deposited (the support or protective layer) may be cooled or heated according to need. Further, heat treatment may be performed to the photostimulable phosphor layer after the deposition is terminated. Further, reactive deposition may be performed according to need by introducing gas such as $O_2$, $H_2$ and the like in the above-described deposition method.

In the sputtering method as a second method, similar to the deposition method, a support is placed in a sputtering apparatus, and air in the sputtering apparatus is discharged so as to obtain a degree of vacuum of approximately $1.333 \times 10^{-4}$ Pa. Next, inert gas such as Ar, Ne or the like is introduced into the sputtering apparatus as gas for sputtering, and a gas pressure is made to $1.333 \times 10^{-1}$ Pa. Next, sputtering is performed by using the photostimulable phosphor as a target, and the photostimulable phosphor layer is grown to a desired thickness on the surface of the support.

In the above-described sputtering step, similar to the deposition method, various application treatments can be used.

There is the CVD method as a third method. Further, there is the ion plating method as a fourth method.

Further, the growth rate of the photostimulable phosphor layer in the above-described vapor phase growth is preferable to be between 0.05 μm/min and 300 μm/min. When the growth rate is less than 0.05 μm/min, the productivity of the radiographic image conversion panel of the present invention becomes low, so that it is not preferable. Further, when the growth rate exceeds 300 μm/min, it becomes difficult to control the growth rate, so that it is not preferable. In case of obtaining a radiographic image conversion panel by the above-mentioned vacuum deposition method, sputtering method or the like, the bulk density of the photostimulable phosphor can be increased since no binder exists, so that a radiographic image conversion panel preferable in sensitivity and resolving power can be obtained.

(Film Thickness of Photostimulable Phosphor Layer)

The dry thickness of the photostimulable phosphor layer changes according to the intended use of the radiographic image conversion panel or according to the types of the photostimulable phosphor. However, from viewpoint of obtaining the above-described effects of the present invention, a film thickness of not less than 50 μm is required, preferably, from 50 μm to 500 μm, further preferably, from 100 μm to 500 μm, and from 400 μm to 500 μm is particularly preferable.

In manufacturing of a photostimulable phosphor layer according to the above-described vapor phase growth, the temperature of the support on which the photostimulable phosphor layer is formed is preferable to be not less than 100° C., further preferably, not less than 150° C., and from 150° C. to 400° C. is particularly preferable.

The photostimulable phosphor layer of the radiographic image conversion panel according to the present invention is formed by performing vapor phase growth of the photostimulable phosphor represented by Formula (1) or (2) on a support. However, it is preferable that the photostimulable phosphor forms a columnar crystal at the time of formation of layer.

The photostimulable phosphor represented by Formula (1) or (2) is used preferably in order to form a columnar photostimulable phosphor layer by a method such as deposition method, sputtering method or the like. However, particularly, a CsBr system phosphor is preferably used.

The photostimulable phosphor layer formed on the support in such a manner does not contain any binder. Therefore, it is excellent in directivity, and the directivity of photostimulated excitation light and photostimulated luminescence is high. Thereby, it is possible to make the layer thickness thicker than the radiographic image conversion panel having a dispersion type photostimulable phosphor layer, in which a photostimulable phosphor is dispersed in a binder. Furthermore, since scattering of photostimulated excitation light in the photostimulable phosphor layer decreases, the sharpness of image improves.

[Crystallite Size of Phosphor in Photostimulable Phosphor Layer]

Crystallite size of the photostimulable phosphor according to the present invention will be explained.

At least one photostimulable phosphor layer according to the present invention is formed by the vapor phase method (also referred to as vapor phase deposition method or vapor phase growth). However, it is essential that the crystallite size of the photostimulable phosphor in the layer is not less than 90 nm.

In the present invention, there are various modes in order to prepare a photostimulable phosphor having a crystallite size of not less than 90 nm. For example, the substrate temperature of the deposited film and control of degree of vacuum at the time of evaporation are important adjustment factors. Concretely, it is preferable to achieve by adjusting the substrate temperature to not more than 170° C. and the degree of vacuum to not more than 0.7 Pa (700 mPa), and by introducing a rare-earth element in the evaporation raw materials.

(Content of Rare-Earth Element)

In the present invention, according to addition of a rare-earth element (also referred to as "activator"), the luminescence luminance of the photostimulable phosphor improves, and deterioration of crystallinity is suppressed to a minimum. From viewpoint of preventing deterioration of contrast and keeping the sharpness of images well, it has been found that a phosphor layer excellent in contrast and persistence property can be formed by making the phosphor crystallite size in a film into not less than 90 nm when introducing $1/100$ to $1/100000$ amount (in response to the total number of moles of $M^{11}$ and $M^{12}$ in Formula (2)) of a rare-earth element (the rare-earth element is also referred to as "activator") into a deposited film.

As the rare-earth element according to the present invention, Eu, Tb, In, Cs, Ce, Tm, Dy, Pr, Ho, Nd, Yb, Er, Gd, Lu, Sm, Y and the like can be given. However, at least one kind of metal selected from a group consisting of Eu, Ce, Cs and Sm is particularly preferable to be used, and Eu is particularly preferable.

(Other Additives in Photostimulable Phosphor Layer)

Additives in the photostimulable phosphor layer according to the present invention will be explained.

A filling material such as binder or the like may be filled in voids among columnar crystals. Further, materials of reinforcement of the photostimulable phosphor layer, materials having high optical absorption, materials having high optical reflectance, and the like may be filled. Thereby, a reinforcement effect can be obtained, and moreover, it is effective to reduce optical dispersion in the transverse direction of the photostimulated excitation light inputted in the photostimulable phosphor layer.

The materials having high reflectance means the ones having high reflectance in response to the photostimulated excitation light (500 nm to 900 nm, particularly, 600 nm to 800 nm). For example, metals such as aluminum, magnesium, silver, indium and the like, white pigments and color materials from green to red region can be used.

The white pigments can also reflect photostimulated luminescence. As the white pigments, $TiO_2$ (anatase type, rutile type), MgO, $PbCO_3.Pb(OH)_2$, $BaSO_4$, $Al_2O_3$, M(II)FX (wherein M(II) is at least one of Ba, Sr and Ca and X is at least one of Cl and Br), $CaCO_3$, ZnO, $Sb_2O_3$, $SiO_2$, $ZrO_2$, lithopone ($BaSO_4.ZnS$), magnesium silicate, basic lead silicosulfate, basic lead phosphate, aluminum silicate and the like can be given. These white pigments have strong covering power and large refractive index. Therefore, the photostimulated luminescence can be scattered easily by reflecting and refracting light, so that it is possible to improve remarkably the sensitivity of the obtained radiographic image conversion panel.

Further, as the materials having high optical absorption, for example, carbon, chromium oxide, nickel oxide, iron oxide and the like, and color material of blue can be used. Among these, carbon also absorbs the photostimulated luminescence.

Further, the color materials may be either organic or inorganic color materials. As the organic system color materials, Zabon Fast Blue 3G (produced by Hoechst), Estrol Brill Blue N-3RL (produced by Sumitomo Chemical), D & C Blue No. 1 (produced by National Aniline), Spirit Blue (produced by Hodogaya Chemical), Oil Blue No. 603 (produced by Orient), Kiton Blue A (produced by Chiba-Geigy), Aizen Catiron Blue GLH (produced by Hodogaya Chemical), Lake Blue AFH (produced by Kyowa Sangyo), Primocyanine 6GX (produced by Inabata & Co.), Brill Acid Green 6BH (produced by Hodogaya Chemical), Cyan Blue BNRCS (produced by Toyo Ink), Lionoil Blue (produced by Toyo Ink) and the like are used.

Further, organic system metal complex salt color materials such as color index Nos. 24411, 23160, 74180, 74200, 22800, 23154, 23155, 24401, 14830, 15050, 15760, 15707, 17941, 74220, 13425, 13361, 13420, 11836, 74140, 74380, 74350, 74460 and the like can be given. As the inorganic system color materials, permanent blue, cobalt blue, cerulean blue, chromium oxide, $TiO_2$—ZnO—Co—NiO system pigments can be given.

[Support]

The support according to the present invention will be explained.

As the support used for the radiographic image conversion panel of the present invention, various glasses, polymeric materials, metals and the like are used. For example, plate glasses such as quartz, borosilicate, chemically-strengthened glasses and the like, plastic films such as cellulose acetate film, polyester film, polyethylene terephthalate film, polyamide film, polyimide film, triacetate film, polycarbonate film and the like, metal sheets such as aluminum sheet, iron sheet, copper sheet and the like, or metal sheets having a coating layer of the metal oxide are preferable.

The surface of these supports may be smooth, or may be matte in order to improve the adhesiveness with the photostimulable phosphor layer.

Further, in the present invention, in order to improve the adhesiveness of the support and the photostimulable phosphor layer, an adhesive layer may be provided on the surface of the support beforehand according to need. The thickness of these supports differs according to the materials and the like of the support to be used. However, generally, it is between 80 µm and 2000 µm. From viewpoint of handling, between 80 µm and 1000 µm is further preferable.

(Protective Layer)

Further, the photostimulable phosphor layer according to the present invention may have a protective layer.

The protective layer may be formed by applying application liquid for protective layer directly on the photostimulable phosphor layer, or a protective layer formed separately beforehand may be adhered on the photostimulable phosphor layer. Besides, a procedure such that the photostimulable phosphor layer is formed on a protective layer formed separately beforehand may be carried out. As the material of the protective layer, a regular material for protective layer such as cellulose acetate, nitrocellulose, polymethyl methacrylate, polyvinyl butyral, polyvinyl formal, polycarbonate, polyester, polyethylene terephthalate, polyethylene, polyvinylidene chloride, nylon, polytetrafluoroethylene, polytrifluoro-ehtylene chloride, tetrafluoroethylene-hexafluoropropylene copolymer, vinylidene chloride-vinyl chloride copolymer, vinylidene chloride-acrylonitrile copolymer or the like is used. Besides these, a transparent glass substrate can be used as a protective layer. Further, the protective layer may be formed by laminating inorganic materials such as SiC, $SiO_2$, SiN, $Al_2O_3$ and the like by deposition method, sputtering method or the like. The layer thickness of these protective layers is generally preferable to be approximately between 0.1 µm and 2000 µm.

Hereinafter, an example of the usage system (also referred to as "diagnostic system") in which the radiographic image conversion panel of the present invention is used will be explained with reference to FIG. 1.

FIG. 1 is a schematic view showing a mode of the usage system of the radiographic image conversion panel of the present invention.

In FIG. 1, the numeral 21 is a radiation generator, 22 is a subject, 23 is a radiographic image conversion panel having a visible light or infrared light photostimulable phosphor layer containing a photostimulable phosphor, 24 is a photostimulated excitation light source for discharging a radiographic latent image of the radiographic image conversion panel 23 as photostimulated luminescence, 25 is a photoelectric conversion device for detecting the photostimulated luminescence discharged by the radiographic image conversion panel 23, 26 is an image processing device for reproducing the photoelectric conversion signal detected by the photoelectric conversion device 25 as an image, 27 is an image display device for displaying the reproduced image, and 28 is a filter for transmitting only the light discharged by the radiographic image conversion panel 23. In addition, FIG. 1 is an example of the case of obtaining a radiographic transmitted image of the subject 22. However, when the subject 22 itself emits radioactive rays, the radiation generator 21 is not required particularly. Further, from the photoelectric conversion device 25, they are not limited to the above if it is possible to somehow reproduce optical information from the radiographic image conversion panel 23.

As shown in FIG. 1, when the subject 22 is disposed between the radiation generator 21 and the radiographic image conversion panel 23, and a radioactive ray R is irradiated, the radioactive ray R transmits through the subject 22 in accordance with changes of radiation transmittance, and its transmitted image RI (that is, an image of strength and weakness of radioactive ray) incidents into the radiographic image conversion panel 23. The incident transmitted image RI is absorbed to the photostimulable phosphor layer of the radiographic image conversion panel 23, and thereby, electrons and/or positive holes whose number is proportional to the radiation dose absorbed in the photostimulable phosphor layer are generated, and these are accumulated at the trap level of the photostimulable phosphor. That is, a latent image accumulating energy of the radiographic transmitted image is formed. Next, the latent image is excited with light energy and is actualized. That is, the electrons and/or positive holes accumulated at the trap level are removed by irradiating a light in visible or infrared region to the photostimulable phosphor layer according to the light source 24, and the accumulated energy is discharged as photostimulated luminescence. The strength and weakness of the discharged photostimulated luminescence are proportional to the number of the accumulated electrons and/or positive holes and the strength and weakness of the radiation energy absorbed in the photostimulable phosphor layer of the radiographic image conversion panel 23. This optical signal is, for example, converted into an electronic signal by the photoelectric conversion device 25 such as photomultiplier or the like, reproduced as an image by the image processing device 26, and the image is displayed by the image display device 27. It becomes more effective if the image processing device 26 which can only reproduce the electronic signal as an image signal, but also can perform so-called image processing, arithmetic of image, storing and saving of image, and the like is used.

Further, when exciting the optical energy, it is required to separate the reflected light of the photostimulated excitation light and the photostimulated luminescence discharged from the photostimulable phosphor layer, and the sensitivity of a photoelectric conversion device 25, which receives luminescence discharged from the photostimulable phosphor layer, in response to the optical energy generally having short wavelength of not more than 600 nm becomes high. From these reasons, the photostimulated luminescence emitted from the photostimulable phosphor layer is desirable to have a spectrum distribution in a short wavelength region. The luminescence wavelength band of the photostimulable phosphor according to the present invention is between 300 nm and 500 nm, on the other hand, the photostimulated excitation wavelength band is between 500 nm and 900 nm, so that it satisfies the above-described conditions. However, recently, miniaturization of diagnostic apparatus proceeds, and a semiconductor laser whose excitation wavelength used for reading images of a radiographic image conversion panel is high power and which is easy to be downsized is preferable. The wavelength of the semiconductor laser is 680 nm, and the photostimulable phosphor incorporated in the radiographic image conversion panel of the present invention shows extremely good sharpness when an excitation wavelength of 680 nm is used.

That is, the photostimulable phosphors according to the present invention show luminescence having a main peak of not more than 500 nm, is easy to separate the photostimulated excitation light, and moreover, corresponds well with the spectral sensitivity of a receiver. Therefore, it can receive lights effectively, and as a result, the sensitivity of an image reception system can be solidified.

As the photostimulated excitation light source 24, a light source including the photostimulated excitation wavelength of the photostimulable phosphor used in the radiographic image conversion panel 23 is used. Particularly, since the optical system becomes simple when a laser beam is used, and further, the photostimulated excitation light intensity can be made large, the photostimulated luminescence efficiency can be improved, so that further preferable results can be obtained.

As a laser, there are metal lasers and the like, such as He—Ne laser, He—Cd laser, Ar ion laser, Kr ion laser, $N_2$ laser, YAG laser and its second harmonic, ruby laser, semiconductor laser, various dye laser, copper vapor laser and the like. Usually, a continuous oscillation laser such as He—Ne laser, Ar ion laser or the like is desirable. However, a pulse oscillation laser can be used if the scanning time of one pixel of the panel is synchronized with the pulse. Further, when the lights are separated by utilizing delay of luminescence without using the filter 28, as disclosed in Japanese Patent Laid-Open Publication No. Sho 59-22046, it is preferable to use a pulse oscillation laser rather than modulating by using a continuous oscillation laser.

Among the above-described various laser light sources, the semiconductor laser is small and cheap, and moreover, no modulator is required. Therefore, it is preferable to be used particularly.

As the filter 28, since it is for transmitting the photostimulated luminescence emitted from the radiographic image conversion panel 23 and for cutting the photostimulated excitation light, this is determined according to combination of the photostimulated luminescence wavelength of the photostimulable phosphor contained in the radiographic image conversion panel 23 and the wavelength of the photostimulated excitation light source 24.

For example, in case of combination preferable in practical use such that the photostimulated excitation wavelength is between 500 nm and 900 nm and the photostimulated luminescence wavelength is between 300 nm and 500 nm, a purple to blue glass filter such as C-39, C-40, V-40, V-42 or V-44 produced by Toshiba Corporation, 7-54 or 7-59 produced by Corning Corporation, BG-1, BG-3, BG-25, BG-37 or BG-38 produced by Spectrofilm Corporation, or the like can be used. Further, in case of using an interference filter, a filter having arbitrary properties can be selected and used to some extent. As the photoelectric conversion device 25, it may be anything if it is possible to convert changes of amount of light into changes of electronic signal, such as photoelectric tube, photomultiplier, photodiode, phototransistor, solar battery, photoconductive element and the like.

EXAMPLES

Hereinafter, the Examples of the present invention will be explained. However, the present invention is not limited to these Examples.

Example 1

[Preparation of Radiographic Image Conversion Panel Samples 1 to 5]

Figure 2:
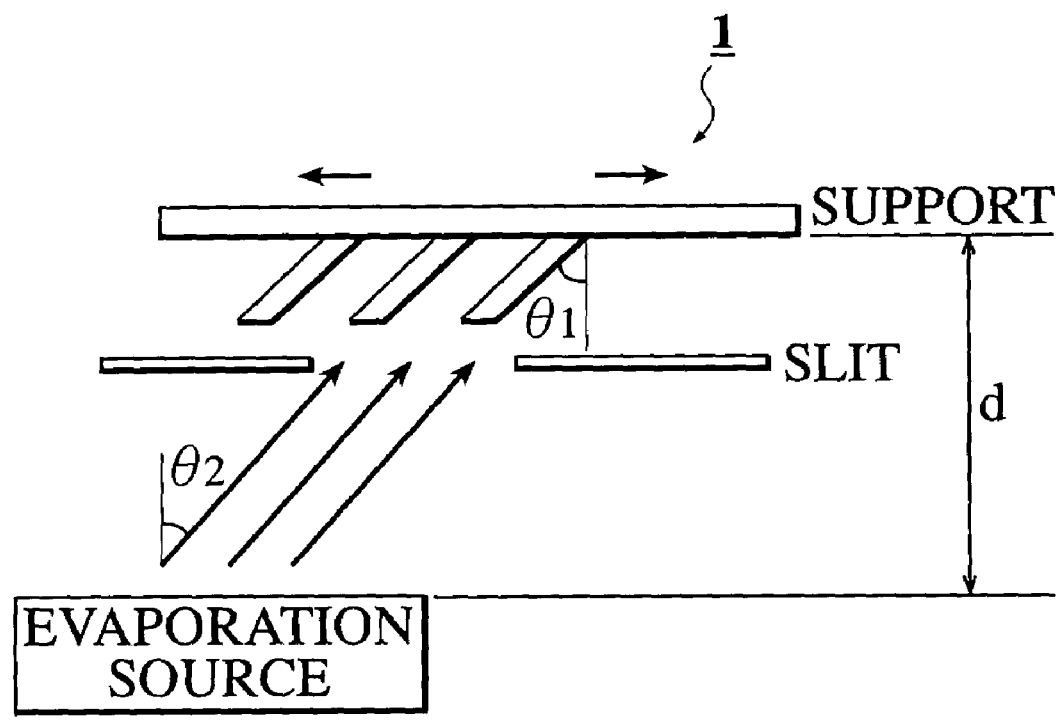
FIG. 2 is a schematic view showing an example of a method for forming a photostimulable phosphor layer on a support according to deposition.

According to the conditions shown in Table 1-1, a photostimulable phosphor layer having a photostimulable phosphor (CsBr:Eu) was formed on the surface of a support of glass ceramics (produced by Nippon Electric Glass Co., Ltd.) having a thickness of 1 mm by using a deposition apparatus 1 (wherein $\theta 1$ and $\theta 2$ are set to $\theta 1=5°$ and $\theta 2=5°$) shown in FIG. 2.

In the deposition apparatus 1 shown in FIG. 2, the distance d between the support and an evaporation source was made to be 60 cm. Then, by using a slit made of aluminum, deposition was performed by carrying the support toward the direction parallel to the longitudinal direction of the slit so as to obtain a photostimulable phosphor layer having a thickness of 300 μm.

In addition, in performing deposition, the support was placed in the deposition apparatus 1. Then, press molding was performed by using the phosphor raw material (CsBr:Eu) as the evaporation source, and the support was charged in a water-cooled crucible.

Thereafter, the air inside of the deposition apparatus 1 was discharged, and $N_2$ gas was introduced. After the degree of vacuum was adjusted to 0.133 Pa, deposition was performed by keeping the temperature of the support (also referred to as "substrate temperature") at approximately 350° C. The deposition was terminated when the film thickness of the photostimulable phosphor layer became 300 μm, and then, the phosphor layer was heat treated at 400° C. so as to obtain a photostimulable phosphor plate. Then, according to the photostimulable phosphor plate, each of the radiographic image conversion panel samples 1 to 5 shown in Tables 1-1 and 1-2 were prepared.

[Evaluation of Luminance]

The luminance was evaluated by using the Regius 350 produced by Konica Corporation. An X-ray was irradiated to the above-described plate with a tungsten bulb of 80 kVp and 10 mAs by making the distance between an exposure source and the plate be 2 m. Thereafter, the plate was placed to the Regius 350 to read the luminance. Relative evaluation was performed on the basis of the electric signals obtained from a photomultiplier. The luminance of each sample is shown with relative value by using the luminance of the sample 2 as 1.0.

[Evaluation of Sharpness]

The sharpness of the radiographic image conversion panel samples was evaluated by obtaining the modulation transfer function (MTF). After a CTF chart was stuck on each radiographic image conversion panel sample, 10 mR of 80 kVp X-ray (the distance to the subject: 1.5 m) was irradiated to the radiographic image conversion panel sample. Thereafter, the CTF chart image was scanned and read by using a semiconductor laser having a diameter of 100 μm (680 nm: the power on the panel was 40 mW). Thus, the MTF was obtained. The values in Table 1-2 are the values such that 1.0 cycle/mm of MTF value was added together. The obtained results are shown in Tables 1-1 and 1-2.

[Measurement of Instant Persistence Ratio and Photostimulated Persistence Ratio]

As the same as the evaluation of luminance, the signal value of the photostimulated luminescence was read and measured. The measurement of the photostimulated persistence ratio was obtained as follows. First, half of each sample was laser-scanned at the time of laser scanning, and a luminance value (a) after scanning was obtained. Then, the laser was turned off to the other half, and a value (b) after X-ray exposure of 300 msec after the laser was turned off was measured. Finally, the photostimulated persistence ratio was obtained as ratio of luminance.

Photostimulated persistence Ratio (%)=(a/b)×100

With the structure of X-ray/plate/photomultiplier (R1305 produced by Hamamatsu Photonics K.K.), the signals after 300 msec of X-ray exposure was measured (c) by using the signals right after X-ray exposure as 1.0. Then, the ratio was made to be instant persistence ratio.

Instant Persistence Ratio (%)=(c/1.0)×100

TABLE 1-1

| RADIOGRAPHIC IMAGE CONVERSION PANEL SAMPLE No. | MAIN ACTIVATOR, SUB-ACTIVATOR 1, SUB-ACTIVATOR 2, LUMINESCENCE WAVELENGTH PEAK (nm), DEPOSITION RATE | LUMINANCE |
|---|---|---|
| 1 | Eu(440)<br>5 μm/min | 0.3 |
| 2 | Eu(440), Gd(410)<br>5 μm/min | 1 |
| 3 | Eu(440), Gd(410), Ce(375)<br>20 μm/min | 1.5 |
| 4 | Eu(440), Gd(410), Ce(375)<br>40 μm/min | 2.1 |
| 5 | Eu(440), Gd(410), Ce(375)<br>60 μ/min | 2.5 |

TABLE 1-2

| RADIOGRAPHIC IMAGE CONVERSION PANEL SAMPLE No. | MTF (21 p/mm) | INSTANT PERSISTENCE (%) | PHOTO-STIMULATED PERSISTENCE (%) | REMARKS |
|---|---|---|---|---|
| 1 | 10% | 1.2 | 1.5 | Comp. |
| 2 | 32% | 0.009 | 0.008 | Inv. |
| 3 | 36% | 0.004 | 0.002 | Inv. |
| 4 | 33% | 0.001 | 0.003 | Inv. |
| 5 | 32% | 0.001 | 0.001 | Inv. |

According to Tables 1-1 and 1-2, it is obvious that the radiographic image conversion panels of the present invention have high luminance, high sharpness and extremely low persistence compared to the Comparative Examples.

Example 2

[Preparation of Radiographic Image Conversion Panel Sample 11]

As described in the following, a photostimulable phosphor in which an activator was introduced, then, a photostimulable phosphor plate having a photostimulable phosphor layer including the photostimulable phosphor, and then, a radiographic image conversion panel 11 were prepared. The panel 11 was prepared by using the photostimulable phosphor plate.

(Preparation of Photostimulable Phosphor Plate 11):

Activator Introduced According to Dry-Type Method

According to the conditions shown in Tables 2-1 and 2-2, a photostimulable phosphor layer having a photostimulable phosphor (CsBr:Eu) was formed on the surface of a support of glass ceramics (produced by Nippon Electric Glass Co., Ltd.) having a thickness of 1 mm by using a deposition apparatus 1 (wherein θ1 and θ2 are set to θ1=5° and θ2=5°) shown in FIG. 2. Thus, a photostimulable phosphor plate 11 was prepared.

In addition, as the introduction method of the activator (Eu) into the evaporation source material used at the time of deposition, the following dry-type method was used.

(Introduction of Activator According to Dry-Type Method)

As evaporation source materials, quantities of cesium bromide and europium bromide were weighed and prepared separately beforehand so as to obtain a compound ratio of them combined in a deposited film (CsBr:Eu). The cesium bromide was charged in a crucible made of metal, Ta (tantalum), which is an evaporation source for cesium bromide. The other europium bromide was charged in another crucible made of metal, Ta (tantalum).

As for the deposition conditions, after the degree of vacuum was reached the value described in Table 2-2, evaporation was performed as follows.

After the degree of vacuum was reached the above-mentioned value, the temperature of the crucible made of Ta, in which the cesium bromide was charged, was raised at a rate of 10° C./min until the crucible temperature reached 650° C., and degassing was performed. Thereafter, after confirming that the inside of the crucible was melted completely at 650° C., a placed shutter was opened to start film forming.

Further, the other crucible made of Ta, in which the europium bromide was charged, was heated until the crucible temperature reached 750° C. However, as for the temperature-programming rate until 750° C., it is preferable to adjust the temperature-programming rate so that the timing will coincide with the time that the temperature of the cesium bromide-charged crucible becomes 650° C.

Here, as for each deposition rate of the europium bromide and the cesium bromide, the deposition conditions were adjusted so that the compound rate would become CsBr:Eu.

Further, in the deposition apparatus 1 shown in FIG. 2, the distance d between the support and an evaporation source was made to be 60 cm. Then, by using a slit made of aluminum, deposition was performed by carrying the support toward the direction parallel to the longitudinal direction of the slit so as to obtain a photostimulable phosphor layer having a thickness of 300 μm.

A radiographic image conversion panel sample 11 was prepared by using the photostimulable phosphor plate sample 11 prepared above. In detail, a protective layer made of glass was provided in a glass-like side edge portion having the photostimulable phosphor layer via a spacer. The protective layer was provided so that the thickness of an air layer as a layer having low refractive index between each photostimulable phosphor layer and the glass used as the protective layer would be 100 μm. In addition, as the spacer, the one made of glass ceramics, and whose thickness was adjusted so that the photostimulable phosphor layer and the layer having low refractive index (air layer) between the support and the protective layer glass would become a predetermined thickness was used. The side edge portions of the glass support and the protective layer made of glass was adhered by using an epoxy system adhesive, and a radiographic image conversion panel sample 11 was prepared.

[Preparation of Radiographic Image Conversion Panel Samples 12 to 18]

Radiographic image conversion panel samples 12 to 18 were prepared in the same manner as the preparation of the radiographic image conversion panel sample 11 except that the introduction method of the activator was changed from the dry-type method to the following wet-type method, and that the preparation conditions (deposition conditions) of the photostimulable phosphor layer were set as described in Table 2-2.

(Introduction of Activator According to Wet-type Method)

The cesium bromide and the europium bromide, which would become evaporation raw materials, were mixed so as to be a predetermined compound ratio, and were dissolved with water to obtain a solution. The obtained solution was heated, and dried and solidified so as to obtain particles having diameter of 50 μm to 200 μm. These particles were dehydrated according to vacuum heating under conditions of 120° C. for 2 hours, and the evaporation raw materials were obtained.

The obtained evaporation source materials were charged in a crucible, and the degree of vacuum in a deposition chamber was confirmed that it was reached the aimed degree of vacuum described in Table 2-2. Then, the applied electric current was increased, and the evaporation source materials were evaporated while adjusting the temperature of the crucible in a range of 750° C. to 950° C.

The above-described film-formed cesium bromide contained Eu therein.

With respect to the obtained radiographic image conversion panel samples 11 to 18, each of the luminance, sharpness and photostimulated persistence ratio (also simply referred to as "luminance persistence") was evaluated as follows.

[Evaluation of Luminance]

The luminance was evaluated by using the Regius 350 produced by Konica Corporation. An X-ray was irradiated to the above-described plate with a tungsten bulb of 80 kVp and 10 mAs by making the distance between an exposure source and the plate be 2 m. Thereafter, the plate was placed to the Regius 350 to read the luminance. Relative evaluation was performed on the basis of the electric signals obtained from a photomultiplier. The luminance of each sample is shown with relative value by using the luminance of the sample 12 as 0.28.

[Evaluation of Sharpness]

The sharpness of the radiographic image conversion panel samples was evaluated by obtaining the modulation transfer function (MTF).

After a CTF chart was stuck on each radiographic image conversion panel sample, 10 mR of 80 kVp X-ray (the distance to the subject: 1.5 m) was irradiated to the radiographic image conversion panel sample. Thereafter, the CTF chart image was scanned and read by using a semiconductor laser having a diameter of 100 μm (680 nm: the power on the panel was 40 mW). Thus, the MTF was obtained. The values in Table 2-3 are the values such that 1.0 cycle/mm of MTF value was added together. The obtained results are shown in Table 2-3.

was measured. Finally, the photostimulated persistence ratio was obtained as ratio of luminance.

Photostimulated persistence Ratio (%)=(a/b)×100

The obtained results were shown in Table 2-3.

TABLE 2-1

| RADIOGRAPHIC IMAGE CONVERSION PANEL SAMPLE No. | PHOTOSTIMULATED PHOSPHOR | | |
|---|---|---|---|
| | GROUND MATERIAL | ACTIVATOR | INTRODUCTION METHOD OF ACTIVATOR |
| 11 | CsBr | Eu | DRY-TYPE |
| 12 | CsBr | Eu | WET-TYPE |
| 13 | CsBr | Eu | WET-TYPE |
| 14 | CsBr | Eu | WET-TYPE |
| 15 | CsBr | Eu | WET-TYPE |
| 16 | CsBr | Eu | WET-TYPE |
| 17 | CsBr | Eu | WET-TYPE |
| 18 | CsBr | Eu | WET-TYPE |

TABLE 2-2

| RADIOGRAPHIC IMAGE CONVERSION PANEL SAMPLE No. | PREPARATION CONDITIONS OF PHOTOPHOSTIMULABLE PHOSPHOR LAYER | | | |
|---|---|---|---|---|
| | DEGREE OF VACUUM (mPa) | SUBSTRATE TEMPERATURE (° C.) | FILM THICKNESS (μm) | CRYSTALLITE SIZE (nm) |
| 11 | 1 | 210 | 420 | 42 |
| 12 | 1 | 180 | 430 | 66 |
| 13 | 10 | 170 | 412 | 90 |
| 14 | 100 | 150 | 450 | 98 |
| 15 | 600 | 150 | 520 | 91 |
| 16 | 100 | 120 | 550 | 102 |
| 17 | 10 | 200 | 478 | 82 |
| 18 | 100 | 100 | 440 | 109 |

TABLE 2-3

| RADIOGRAPHIC IMAGE CONVERSION PANEL SAMPLE No. | LUMINANCE | SHARPNESS (%) | LUMINANCE PERSISTENCE | REMARKS |
|---|---|---|---|---|
| 11 | 0.15 | 12 | 0.0124 | Comp. |
| 12 | 0.28 | 13 | 0.0088 | Comp. |
| 13 | 0.83 | 36 | 0.0012 | Inv. |
| 14 | 1.45 | 33 | 0.0009 | Inv. |
| 15 | 0.99 | 34 | 0.001 | Inv. |
| 16 | 1.88 | 38 | 0.0006 | Inv. |
| 17 | 0.47 | 22 | 0.0062 | Comp. |
| 18 | 2.11 | 34 | 0.0002 | Inv. |

[Measurement of Photostimulated Persistence Ratio]

As the same as the evaluation of luminance, the signal value of the photostimulated luminescence was read and measured. The measurement of the photostimulated persistence ratio was obtained as follows. First, half of each sample was laser-scanned at the time of laser scanning, and a luminance value (a) after scanning was obtained. Then, the laser was turned off to the other half, and a value (b) after X-ray exposure of 300 msec after the laser was turned off According to Tables 2-1 to 2-3, it is found that the radiographic image conversion panel samples of the present invention have excellent luminance and sharpness, and their persistence is extremely low compared to the Comparative Examples.

In the above, the Examples of the present invention are explained. However, it is needless to say that the present invention is not limited to such Examples, but various modifications are possible in a range within the scope of the present invention.

According to the present invention, a radiographic image conversion panel having high luminance, high sharpness and low persistence can be obtained. Further, a radiographic image conversion panel having high contrast and showing high luminance and low persistence, and a method for manufacturing the radiographic image conversion panel can be provided.

The entire disclosure of Japanese Patent Application Nos. 2002-300306 and 2003-036451 filed on Oct. 15, 2002 and Feb. 14, 2003, respectively, including specification, claims, drawings and summary are incorporated herein by reference in its entirety.

What is claimed is:

1. A radiographic image conversion panel comprising:
   a support; and
   at least one photostimulable phosphor layer provided on the support,
   wherein the layer has a film thickness of 50 μm to 1 mm, and has not less than two luminescence wavelength peaks between 350 nm and 450 nm, and contains a photostimulable phosphor having an alkali halide represented by the following Formula (1) as a ground material $$M^1X.aM^2X'_2:eA, A'' \quad (1)$$

where the $M^1$ is at least one kind of alkali metal selected from a group consisting of Li, Na, K, Rb and Cs, the $M^2$ is at least one kind of bivalent metal atom selected from a group consisting of Be, Mg, Ca, Sr, Ba, Zn, Cd, Cu and Ni, each of the X and the X' is at least one kind of halogen selected from a group consisting of F, Cl, Br and I, each of the A and the A'' is at least one kind of rare-earth element selected from a group consisting of Eu, Tb, In, Ce, Tm, Dy, Pr, Ho, Nd, Yb, Er, Gd, Lu, Sm and Y, and each of the a and the e represents a numeric value in a range of $0 \leq a < 0.5$ and $0 < e \leq 0.2$.

2. The panel of claim 1, wherein a crystallite size of the photostimulable phosphor in the layer is not less than 90 nm.

3. The panel of claim 1, wherein the layer is formed according to a vapor phase growth.

4. A radiographic image conversion panel comprising:
   a support; and
   at least one photostimulable phosphor layer provided on the support,
   wherein the layer has a film thickness of 50 μm to 1 mm, has not less than two luminescence wavelength peaks between 350 nm and 450 nm, and contains a photostimulable phosphor having an alkali halide represented by the following Formula (2) as a ground. material, $$M^{11}X_1.bM^{12}X'_1{}_2.cM^{13}X''_1{}_3:fA_1 \quad (2)$$

where each of the $M^{11}$ and the $M^{12}$ is at least one kind of alkali metal selected from a group consisting of Li, Na, K, Rb and Cs, the $M^{11}$ and the $M^{12}$ being different alkali metal from each other, the $M^{13}$ is at least one kind of tervalent metal atom selected from a group consisting of Y, La, Ce, Pr, Nd, Pm, Sm, Eu, Gd, Tb, Dy, Ho, Er, Tm, Yb and Lu, each of the $X_1$, the $X_1'$ and the $X_1''$ is at least one kind of halogen selected from a group consisting of F, Cl, Br and I, the $A_1$ is at least one kind of rare-earth element selected from a group consisting of Eu, Tb, In, Cs, Ce, Tm, Dy, Pr, Ho, Nd, Yb, Er, Gd, Lu, Sm and Y, and each of the b, the c and the f represents a numeric value in a range of $0 \leq b < 0.5$, $0 \leq c < 0.5$ and $0 < f \leq 0.2$.

5. The panel of claim 4, wherein a crystallite size of the photostimulable phosphor in the layer is not less than 90 nm.

6. The panel of claim 4, wherein the layer is formed according to a vapor phase growth.

7. A method for manufacturing a radiographic image conversion panel having at least one photostimulable phosphor layer, comprising:
   forming the layer according to a vapor phase growth so that the layer has a film thickness of 50 μm to 1 mm and not less than two luminescence wavelength peaks between 350 nm and 450 nm,
   wherein the layer contains a photostimulable phosphor having an alkali halide represented by the following Formula (1) as a ground material, $$M^1X.aM^2X'_2:eA, A'' \quad (1)$$

where the $M^1$ is at least one kind of alkali metal selected from a group consisting of Li, Na, K, Rb and Cs, the $M^2$ is at least one kind of bivalent metal atom selected from a group consisting of Be, Mg, Ca, Sr, Ba, Zn, Cd, Cu and Ni, each of the X and the X' is at least one kind of halogen selected from a group consisting of F, Cl, Br and I, each of the A and the A'' is at least one kind of rare-earth element selected from a group consisting of Eu, Tb, In, Ce, Tm, Dy, Pr, Ho, Nd, Yb, Er, Gd, Lu, Sm and Y, and each of the a and the e represents a numeric value in a range of $0 \leq a < 0.5$ and $0 < e \leq 0.2$.

8. The method of claim 7, wherein a crystallite size of the photostimulable phosphor in the layer is not less than 90 nm.

9. A method for manufacturing a radiographic image conversion panel having at least one photostimulable phosphor layer, comprising:
   forming the layer according to a vapor phase growth so that the layer has a film thickness of 50 μm to 1 mm and not less than two luminescence wavelength peaks between 350 nm and 450 nm,
   wherein the layer contains a photostimulable phosphor having an alkali halide represented by the following Formula (2) as a ground material, $$M^{11}X_1.bM^{12}X'_1{}_2.cM^{13}X''_1{}_3:fA_1 \quad (2)$$

where each of the $M^{11}$ and the $M^{12}$ is at least one kind of alkali metal selected from a group consisting of Li, Na, K, Rb and Cs, the $M^{11}$ and the $M^{12}$ being different alkali metal from each other, the $M^{13}$ is at least one kind of tervalent metal atom selected from a group consisting of Y, La, Ce, Pr, Nd, Pm, Sm, Eu, Gd, Tb, Dy, Ho, Er, Tm, Yb and Lu, each of the $X_1$, the $X_1'$ and the $X_1''$ is at least one kind of halogen selected from a group consisting of F, Cl, Br and I, the $A_1$ is at least one kind of rare-earth element selected from a group consisting of Eu, Tb, In, Cs, Ce, Tm, Dy, Pr, Ho, Nd, Yb, Er, Gd, Lu, Sm and Y, and each of the b, the c and the f represents a numeric value in a range of $0 \leq b < 0.5$, $0 \leq c < 0.5$ and $0 < f \leq 0.2$.

10. The panel of claim 9, wherein a crystallite size of the photostimulable phosphor in the layer is not less than 90 nm.

* * * * *